(12) United States Patent
Garcia-Luna-Aceves et al.

(10) Patent No.: US 7,203,191 B2
(45) Date of Patent: Apr. 10, 2007

(54) METHOD FOR LOOP-FREE MULTIPATH ROUTING USING PREDECESSOR INFORMATION

(75) Inventors: Jose Joaquin Garcia-Luna-Aceves, San Mateo, CA (US); Srinivas Vutukury, Sunnyvale, CA (US)

(73) Assignee: The Regents of the University of California, Oakland, CA (US)

( * ) Notice: Subject to any disclaimer, the term of this patent is extended or adjusted under 35 U.S.C. 154(b) by 851 days.

(21) Appl. No.: 09/975,556

(22) Filed: Oct. 10, 2001

(65) Prior Publication Data

US 2002/0067720 A1 Jun. 6, 2002

Related U.S. Application Data

(60) Provisional application No. 60/239,420, filed on Oct. 10, 2000.

(51) Int. Cl.
*H04L 12/28* (2006.01)
(52) U.S. Cl. ...................................... 370/389
(58) Field of Classification Search ................. 716/12; 370/389, 400, 230
See application file for complete search history.

(56) References Cited

U.S. PATENT DOCUMENTS 5,850,537 A * 12/1998 Selvidge et al. ............... 716/12

OTHER PUBLICATIONS

Dijkstra, Edsger W., Scholten, C.S.; Termination Detection for Diffusing Compuations, Information Processing Letters, vol. 11, No. 1, pp. 1 thru 4, Aug. 29, 1980.

Farinachi, D.; Introduction to Enhanced IGRP (EIGRP), Cisco Systems, Inc., pp. 1 thru 5, http://www.cisco.com/warp/public/103/1.html, Jul. 1993 (Sep. 21, 2001).

Garcia-Luna-Aceves, J.J.; "Loop-Free Routing Using Diffusing Computations," IEEE/ACM Transactions on Networking, vol. 1, No. 1, pp. 130-141, Feb. 1993.

Garcia-Luna-Aceves, J.J., Behrens, J.; "Distributed, Scalable Routing Based on Vectors of Link States," IEEE Journal on Selectred Areas in Communications, pp. 1-13, Oct. 1995.

Garcia-Luna-Aceves, J.J., Murthy, S.; "A Path-Finding Algorithm for Loop-Free Routing," IEEE/ACM Transactions Networking, pp. 1-22, Feb. 1997.

Garcia-Luna-Aceves, J.J., Spohn, M.; "Scalable Link-State Internet Routing," Proceedings International Conference on Network Protocols, pp. 1-10, Oct. 1998.

(Continued)

*Primary Examiner*—Doris H. To
*Assistant Examiner*—Robert W. Wilson
(74) *Attorney, Agent, or Firm*—John P. O'Banion

(57) ABSTRACT

A method is described for routing network traffic based on distance information to provide multiple paths that need not have equal costs. The routing algorithm MPATH of the present method provide loop-free routing at every instant, without the need of internodal synchronization which spans more than a single hop. Paths are computed using shortest distances and predecessor information in the routing computation. The use of multiple-successors allows for load-balancing within the network. The algorithm is both distributed and scalable to large networks due to its use of only one-hop synchronization. A number of procedures are described by way of example, including path computation, main table updating, neighbor table updating, and a multipath (MPATH) algorithm.

58 Claims, 6 Drawing Sheets

Procedure *INIT-PATH*
{*Invoked when the node comes up.*}
1. Initialize all tables.
2. Run *PATH* algorithm.
End *INIT-PATH*

Algorithm *PATH*
{*Invoked when a message M is received from neighbor k, or an adjacent link to k has changed or when a node is initialized.*}
1. Run *NTU* to update neighbor tables.
2. Run *MTU* to update main tables.
3. For each destination *j* marked as *changed*,
  Add update entry $[j, D_j^i, p_j^i]$ to the new message $M'$.
4. Within finite amount of time, send message $M'$ to each neighbor.
End *PATH*

OTHER PUBLICATIONS

Hedrick, C.; Routing Information Protocol, Network Working Group, Request for Comments 1058, pp. 1-4, Jun. 1988.

Humblet, Pierre A., "Another Adaptive Distributed Shortest Path Algorithm," IEEE Transactions on Communications, vol. 39, No. 6, pp. 995-1003, Jun. 1991.

Jaffe, Jeffrey M., Moss, Franklin H.; "A Responsive Distributed Routing Algorithm for Computer Networks," IEEE Transactions on Communication, vol. COM-30, No. 7, pp. 1758-1762, Jul. 1982.

Merlin, Philip M., Segall, Adrian; "A Failsafe Distributed Routing Protocol," IEEE Transactions on Communications, vol. COM-27, No. 9, pp. 1280-1287, Sep. 1979.

Moy, J.; "OSPF Version 2," Network Working Group, Request for Comments: 2178, obsoletes RFC: 1583, pp. 1-5, 209-211, Jul. 1997.

Rajagopalan, Balasubramanian and Faiman, Michael; "A New Responsive Distributed Shortest-Path Routing Algorithm," Reference pages pp. ii and 9, from Internetworking: Research and Experience, vol. 2, pp. 51-69, Mar. 1991.

Segall, Adrian: "Optimal Distributed Routing for Virtual Line-Switched Data Networks," IEEE Transactions on Communications, vol. COM-27, No. 1, pp. 201-208, Jan. 1979.

Spinelli, John M. and Gallager, Robert G.; "Event Driven Topology Broadcast Without Sequence Numbers," IEEE Transactions on Communications, vol. 27, No. 5, pp. 468-474, May 1989.

Vutukury, Srinivas, Garcia-Luna-Aceves, J.J.; "A Simple Approximation to Minimum-Delay Routing," Proceedings of ACM SIGCOMM, pp. 1-12, (1999).

Zaumen, William T. and Garcia-Luna-Aceves, J.J.; "Loop-Free Multipath Routing Using Generalized Diffusing Computations," Proceedings IEEE INFOCOM, pp. 1-10, Mar. 1998.

* cited by examiner

Procedure INIT-PATH
{Invoked when the node comes up.}
1. Initialize all tables.
2. Run PATH algorithm.
End INIT-PATH Algorithm PATH
{Invoked when a message M is received from neighbor k, or an adjacent link to k has changed or when a node is initialized.}
1. Run NTU to update neighbor tables.
2. Run MTU to update main tables.
3. For each destination $j$ marked as *changed*, Add update entry $[j, D^i_j, p^i_j]$ to the new message $M'$.
4. Within finite amount of time, send message $M'$ to each neighbor.
End PATH

FIG. 1

Procedure NTU
{Called by PATH to process an event.}
1. If event is a message M from neighbor $k$,
   a. For each entry $[j, d, p]$ in M //Note $d = D^k_j, p = p^k_j$)
      Set $D^i_{jk} \leftarrow d$ and $p^i_{jk} \leftarrow p$
   b. For each destination $j$ with an entry in M,
      Remove existing links $(n, j)$ in $T^i_k$ and add new link $(m, j, d)$ to $T^i_k$, where $d = D^i_{jk} - D^i_{mk}$ and $m = p^i_{jk}$.
2. If the event is an adjacent link-status change, update $l^i_k$ and clear neighbor tables of $k$, if link is down.
End NTU

FIG. 2

Procedure *MTU*
1. Clear link table $T^i$
2. For each node $j \neq i$ occuring in at least one $T_k^i$
   a. Find $MIN \leftarrow min\{D_{jk}^i + l_k^i | k \in N^i\}$.
   b. Let $n$ be such that $MIN = (D_{jn}^i + l_n^i)$. Ties are broken *consistently*. Neighbor $n$ is the preferred neighbor for destination $j$. For each link $(j, v, d)$ in $T_n^i$
      Add link $(j, v, d)$ to $T^i$
3. Update $T$ with each link $l_k^i$
4. Run Dijkstra's shortest path algorithm on $T^i$ to find new $D_j^i$, and $p_j^i$.
5. For each destination $j$, if $D_j^i$ or $p_j^i$ changed from previous value, set *changed* and *report-it* flags for $j$.
End *MTU*

FIG. 5

Procedure *INIT-MPATH*
    {*Invoked when the node comes up.*}
    1. Initialize tables and run MPATH.
End *INIT-MPATH*

Algorithm M P A T H
    {*Invoked when a message M is received from neighbor k,*
    *or an adjacent link to k has changed.*}
    1. Run *NTU* to update neighbor tables.
    2. Run *MTU* to obtain new $D_j^i$ and $p_j^i$.
    3. If node is *PASSIVE* or node is *ACTIVE* ∧ last reply arrived,
        Reset *goactive* flag.
        For each destination *j* marked as *report-it*,
            a. $FD_j^i \leftarrow min\{D_j^i, RD_j^i\}$
            b. If $D_j^i > RD_j^i$, Set *goactive* flag.
            c. $RD_j^i \leftarrow D_j^i$
            d. Add [$j, RD_j^i, p_j^i$] to message *M'*.
            e. Clear *report-it* flag for *j*.
        Otherwise, the node is ACTIVE and waiting for more replies,
            For each destination *j* marked as *changed*,
            f. $FD_j^i \leftarrow min\{D_j^i, FD_j^i\}$
    4. For each destination *j* marked as *changed*,
        a. Clear *changed* flag for *j*
        b. $S_j^i \leftarrow \{k | D_{jk}^i < FD_j^i\}$
    5. For each neighbor *k*,
        a. $M'' \leftarrow M'$
        b. If event is *query* from *k*, Set *reply* flag in *M''*.
        c. If *goactive* set, Set *query* flag in *M''*.
        d. If *M''* non-empty, send *M''* to *k*.
    6. If *goactive* set, become *ACTIVE*, otherwise
        become *PASSIVE*.
END *MPATH*

FIG. 6

METHOD FOR LOOP-FREE MULTIPATH ROUTING USING PREDECESSOR INFORMATION

CROSS-REFERENCE TO RELATED APPLICATIONS

This application claims priority from U.S. provisional application Ser. No. 60/239,420 filed on Oct. 10, 2000, incorporated herein by reference.

STATEMENT REGARDING FEDERALLY SPONSORED RESEARCH OR DEVELOPMENT

This invention was made with Government support under Grant No. F30602-97-2-0338, awarded by the Air Force Office of Scientific Research (AFOSR). The Government has certain rights in this invention.

REFERENCE TO A COMPUTER PROGRAM APPENDIX

Not Applicable

BACKGROUND OF THE INVENTION

1. Field of the Invention

The present invention generally pertains to computing routes within a network, and more particularly to a routing algorithm for computing multiple loop-free routes between each source-destination pair.

2. Description of the Background Art

The most popular routing protocols used in today's internets are based on the exchange of vectors of distance, such as RIP and EIGRP; or topology maps, such as OSPF. It should be noted that RIP and a number of similar routing protocols which are based on the distributed Bellman-Ford algorithm (DBF) for shortest-path computation, suffer from the bouncing effect and counting-to-infinity problems, which limit their applicability to small networks using hop count as the measure of distance. While OSPF and algorithms based on topology-broadcast are hindered by excessive communication overhead, which forces the network administrators to partition the network into distinct areas which are interconnected by a backbone. As a result the use of OSPF leads to a complex solution, in terms of the required router configuration. The routing protocol EIGRP utilizes a loop-free routing algorithm called DUAL (Diffusing Update Algorithm), which is based on internodal coordination that can span multiple hops.

In addition to DUAL, several algorithms based on distance vectors have been proposed to overcome the counting-to-infinity problem of DBF. All of these algorithms rely on exchanging queries and replies along multiple hops, a technique that is sometimes referred to as diffusing computations, because it has its origin in Dijkstra and Scholten's basic algorithm.

A couple of routing algorithms have been proposed that operate using partial topology information to eliminate the main limitations of topology-broadcast algorithms. Furthermore, several distributed shortest-path algorithms have been proposed that use the distance and second-to-last hop to destinations as the routing information exchanged among nodes. These algorithms are often called path-finding algorithms or source-tracing algorithms. All of these algorithms eliminate DBF's counting to infinity problem, and some of them are more efficient than any of the routing algorithms based on link-state information proposed to date. Furthermore, LPA (the Loop-free Path-finding Algorithm) is maintained loop-free at every instant.

With the exception of DASM (Diffusing Algorithm for Shortest Multipath), all of the above routing algorithms focus on the provision of a single path to each destination. A drawback of DASM, however, is that it uses multi-hop synchronization, which limits its scalability. Recently a routing protocol referred to as MPDA (Multiple-path Partial-topology Dissemination Algorithm) has been proposed which is a method based on link-states that provides multiple loop-free path routing utilizing one-hop synchronization.

Therefore, a need exists for a routing protocol which is scalable, and provides multipath unequal cost routing based on distance vectors, which is assured to be loop-free. The present invention satisfies those needs, as well as others, and overcomes the deficiencies of previously developed protocols.

BRIEF SUMMARY OF THE INVENTION

The present invention is a routing method that determines multiple loop-free paths between source and destination pairs, which utilizes shortest distances and predecessor information in its route computation. A variant of MPDA is herein presented which is referred to as MPATH, which is a routing algorithm based on distance vectors that: (a) provides multiple paths of unequal cost to each destination that are free of loops at every instant, both in steady state as well as during network transitions, and (b) utilizes a synchronization mechanism that spans only one hop, which makes it more scalable than routing algorithms based on diffusing computations spanning multiple hops. MPATH is a path-finding algorithm, and differs from prior similar algorithms in the invariants used to ensure multiple loop-free paths of unequal cost. The peculiar differences between MPATH and MPDA is a result of the differences in the kind of information that nodes exchange.

An object of the invention is to provide a routing protocol for computing multiple routes of unequal cost.

Another object of the invention is to provide a routing protocol in which the routes are assured to be loop-free at every instant.

Another object of the invention is to provide a routing protocol that does not require internodal synchronization which spans greater than a single hop.

Another object of the invention is to provide a routing protocol of low complexity, wherein the requirements for storage, time, computation, and communication are minimized.

Another object of the invention is to provide a routing protocol which always converges to a shortest distant route.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is pseudocode for a path algorithm according to an aspect of the present invention, shown with an initialization procedure and a path routing algorithm to each destination.

FIG. 2 is pseudocode for a neighbor table update algorithm according to an aspect of the present invention.

FIG. 5 is pseudocode which exemplifies updating of the main table according to an aspect of the present invention.

FIG. 6 is pseudocode which exemplifies multipath routing according to an aspect of the present invention.

DETAILED DESCRIPTION OF THE INVENTION

Figure 3A:
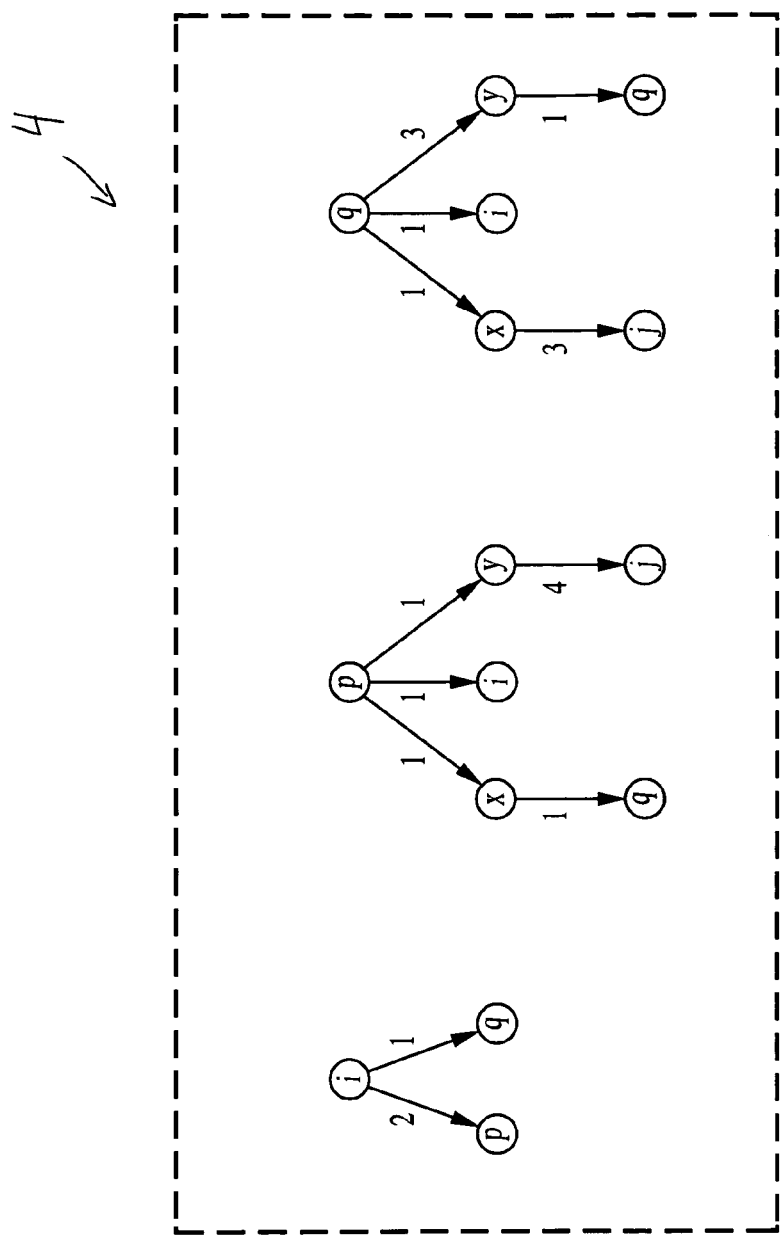
FIG. 3A is a topology diagram within which table updates are exemplified according to an aspect of the present invention, shown with adjacent links and neighbor tables.

Referring more specifically to the drawings, for illustrative purposes the present invention is embodied in the apparatus and methods generally shown in FIG. 1 through FIG. 6. It will be appreciated that the apparatus may vary as to configuration and as to details of the parts, and that the method may vary as to the specific steps and sequence, without departing from the basic concepts as disclosed herein.

1. Distributed Multipath Routing Algorithm 1.1. Problem Formulation

A computer network is represented as a graph G=(N,L) where N is the set of nodes, typically routers, and L is the set of edges, links, connecting the nodes within the network. A cost is associated with each link that can change over time, but is always positive. Two nodes connected by a link are called adjacent nodes or neighbors. The set of all neighbors of a given node i is denoted by $N^i$. Adjacent nodes communicate with each other using messages and messages transmitted over an operational link are received with no errors, in the proper sequence, and within a finite timeframe. Furthermore, such messages are processed by the receiving node one at a time in the order received. A node detects the failure, recovery and link cost changes of each adjacent link within a finite time.

The goal of the present distributed routing algorithm is to determine at each node i the successor set of i for destination j, which we denote by $S_j^i(t) \subseteq N^i$, such that the routing graph $SG_j(t)$ consisting of link set $\{(m,n) | n \in S_j^m(t), m \in N\}$ is free of loops at every instant t, even when link costs are changing with time. The routing graph $SG_j(t)$ for single-path routing is a sink-tree rooted at j, because the successor sets $S_j^i(t)$ have at most one member. In multipath routing, there can be more than one member in $S_j^i(t)$ therefore, $SG_j(t)$ is a directed acyclic graph with j as the sink node. There are potentially several $SG_j(t)$ for each destination j; however, the routing graph we are interested is defined by the successor sets $S_j^i(t)=\{k | D_j^k(t) < D_j^i(t), k \in N^i\}$, where $D_j^i$ is the shortest distance of node i to destination j, which is referred to as a shortest multipath routing graph for destination j.

After a series of link cost changes which leave the network topology in arbitrary configuration, the distributed routing algorithm should work to modify $SG_j$ in such a way that it eventually converges to the shortest multipath of the new configuration, without ever creating a loop in $SG_j$ during the process.

Since $D_j^k$ is a local variable of node k, its value has to be explicitly or implicitly communicated to node i. If $D_{jk}^i$ is the value of $D_j^k$ as known to node i, the problem now becomes one of computing $S_j^i(t)=\{k | D_{jk}^i(t) < D_j^i(t)\}$. However, because of non-zero propagation delays during network transitions, discrepancies can exist in the value of $D_j^k$ and its copy $D_{jk}^i$ at i, which may cause loops to form in $SG_j(t)$. To prevent loops, therefore, additional constraints must be imposed when computing $S_j^i$. If the successor set at each node i for each destination j satisfies certain conditions called loop-free invariant conditions, then the snapshot at time t of the routing graph $SG_j(t)$ implied by $S_j^i(t)$ is free of loops. The solution within the present invention solves this problem in two parts: (1) computing $D_j^i$ using a shortest-path routing algorithm called PATH, and (2) extending it to compute $S_j^i$ such that they satisfy loop-free invariant conditions at every instant.

1.2. Node Tables and Message Structures

As in DBF, nodes executing MPATH exchange messages containing distances to destinations. In addition to the distance to a destination, nodes also exchange the identity of the second-to-last node, also called predecessor node, which is the node just before the destination node on the shortest path. In this respect MPATH is similar to several prior algorithms but differs in its specification, verification and analysis and, more importantly, in the multipath operation described in the next section.

The following information is maintained at each node:

1. A Main Distance Table that contains $D_j^i$ and $p_j^i$, where $D_j^i$ is the distance of node i to destination j and $p_j^i$ is the predecessor to destination j on the shortest path from i to j. The table also stores for each destination j, the successor set $S_j^i$, feasible distance $FD_j^i$, reported distance $RD_j^i$, and two flags "changed" and "report-it".

2. A Main Link Table $T^i$ that is the node's view of the network and contains links represented by (m, n, d) where (m, n) is a link with cost d.

3. A Neighbor Distance Table for neighbor k containing $D_{jk}^i$ and $p_{jk}^i$ where $D_{jk}^i$ is the distance of neighbor k to j as communicated by k, and $p_{jk}^i$ is the predecessor to j on the shortest path from k to j as notified by k.

4. A Neighbor Link Table $T_k^i$ containing the view that neighbor k has of the network as known to i and contains link information derived from the distance and predecessor information in the neighbor distance table.

5. An Adjacent Link Table that stores the cost $l_k^i$ of adjacent link to each neighbor k. If a link is down its cost is infinity.

Nodes exchange information using update messages which have the following format:

1. An update message can one or more update entries. An update entry is a triplet [j,d, p], where d is the distance of the node sending the message to destination j and p is the predecessor on the path to j; and 2. Each message carries two flags used for synchronization: query and reply.

1.3. Computing $D_j^i$

As mentioned earlier, the strategy within the present invention is to first design a shortest-path routing algorithm and then make the multipath extensions to it. This subsection describes our shortest-path algorithm PATH and the next subsection describes the multipath extensions. FIG. 1 illustrates pseudocode for an example of the PATH procedure. INIT-PATH is called at node startup to initialize the tables, distances are initialized to infinity and node identities are initialized to a null value. PATH is executed in response to an event that can be either a receipt of an update message from a neighbor, or detection of an adjacent link cost or link status (up/down) change. PATH invokes procedure NTU, described in FIG. 2, which first updates the neighbor distance tables and then updates $T_k^i$ with links (m, n, d) where $d=D_{nk}^i-D_{mk}^1$ and $m=p_{nk}^i$. PATH then invokes procedure MTU, specified in FIG. 5, which constructs $T^i$ by merging the topologies $T_k^i$ and the adjacent links $l_k^i$.

Figure 3B:
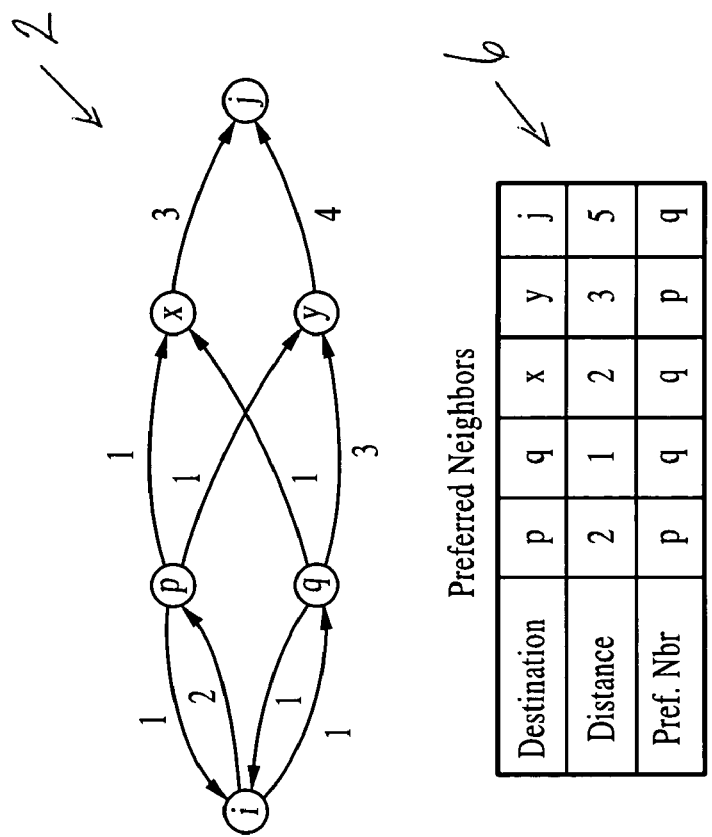
FIG. 3B is a topology diagram with a distance table for illustrating the table update procedure within an aspect of the present invention, shown with a table of preferred neighbors.

FIG. 3A and FIG. 3B illustrate updating of the main table 6 for an example network topology 2. FIG. 3A depicts adjacent links and neighbor tables 4 of node i, while FIG. 3B depicts the network topology 2 along with a table 6 of preferred neighbors along with the main link table of node i after merging the neighbor tables 4.

The merging process is straightforward if all neighbor topologies $T_k^i$ contain consistent link information, but when two or more neighbors link tables contain conflicting information regarding a particular link, the conflict must be resolved. Two neighbor tables are said to contain conflicting information regarding a link, if either both report the link with different cost or one reports the link and the other does not. Conflicts are resolved as follows: if two or more neighbor link tables contain conflicting information of link (m, n), then $T^i$ is updated with link information reported by the neighbor k that offers the shortest distance from the node i to the head node m of the link, such as $l_k^i+D_{mk}^i=\min\{l_k^i+D_{mk}^i|k\in N^i\}$. Ties are broken in a consistent manner; one way is to break ties always in favor of lower address neighbor. Because i itself is the head of the link for adjacent links, any information about an adjacent link supplied by neighbors will be overridden by the most current information about the link available to node i.

Figure 4A:
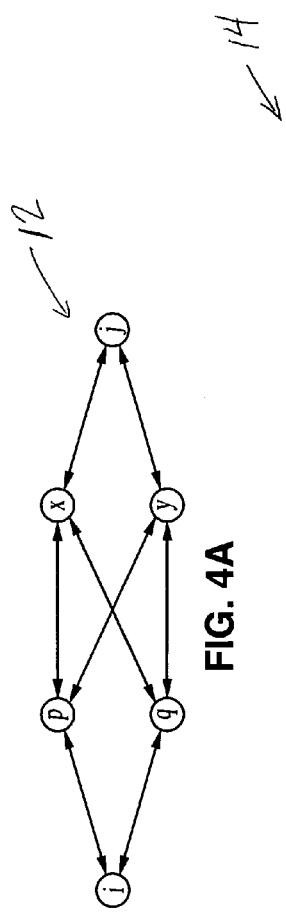
FIG. 4A is a topology diagram which exemplifies tie-breaking rules according to an aspect of the present invention, shown with unit link costs.
Figure 4B:
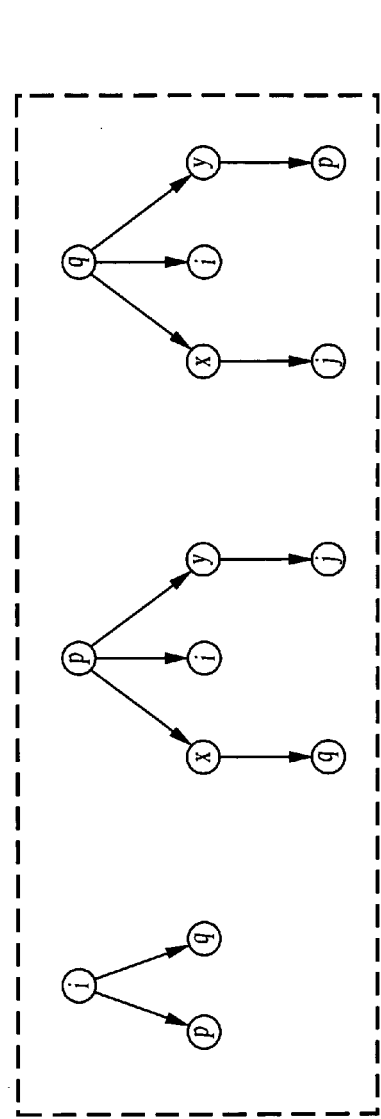
FIG. 4B is a topology diagram which exemplifies tie-breaking rules according to an aspect of the present invention, shown with costs of adjacent links and shortest-path trees of neighboring nodes.
Figure 4C:
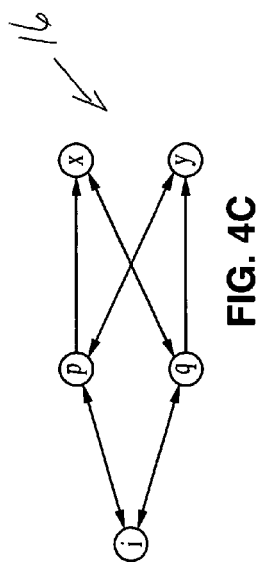
FIG. 4C is a topology diagram which exemplifies tie-breaking rules according to an aspect of the present invention, showing a tie-break resolution.

FIG. 4A through FIG. 4C shows the significance of the tie-breaking rule. FIG. 4A depicts an example network topology 12 with unit link costs. FIG. 4B illustrates node i having the costs of its adjacent links and the shortest path trees 14 of its neighbors p and q. The distances of nodes x and y from i is identical through both neighbors p and q. FIG. 4C illustrates that if MTU breaks ties in an arbitrary manner while constructing $T^i$, it may choose p as the preferred neighbor for node x and choose q as the preferred neighbor for node y, which results in a graph 16 that has no path from i to j. It will be appreciated, therefore, that ties should not be broken in an arbitrary manner.

After merging the topologies, MTU runs Dijkstra's shortest path algorithm to find the shortest path tree and deletes all links from $T^i$ that are not in the tree. Because there can be more than one shortest-path tree, while running Dijkstra's algorithm ties are again broken in a consistent manner. The distances $D_j^i$ and predecessors $p_j^i$ can then be obtained from $T_i$. The tree is compared with the previous shortest path tree and only the differences are then reported to the neighbors. If there are no differences, no updates are reported. Eventually all tables converge such that $D_j^i$ yields the shortest distances and all message activity ceases.

1.4. Computing $S_j^i$

In this subsection, the final desired routing algorithm MPATH is derived by making extensions to PATH. MPATH computes the successor sets $S_j^i$ by enforcing the Loop-free Invariant conditions described below and using a neighbor-to-neighbor synchronization.

Let an "estimate" of the distance of node i to node j, be referred to as the feasible distance, $FD_j^i$; in a similar manner as $FD_j^i$ is equal to $D_j^i$ when the network is in a stable state, but to prevent loops during periods of network transitions, it is allowed to temporarily differ from $D_j^i$. Loop-free invariant conditions can be expressed as follows:

$$FD_j^i(t) \leq D_{ji}^k(t) k \in N^i \quad (1)$$

$$S_j^i(t)=\{k|D_{ji}^k(t)<FD_j^i(t)\} \quad (2)$$

The invariant conditions (1) and (2) state that, for each destination j, a node i can choose a successor whose distance to j, as known to i, is less than the distance of node i to j that is known to its neighbors.

Theorem 1: If the LFI conditions are satisfied at any time t, the $SG_j(t)$ implied by the successor sets $S_j^i(t)$ is loop-free.

Proof: Let $k \in S_j^i(t)$ then from Eq. 2 it follows that:

$$D_{jk}^i(t)<FD_j^i(t) \quad (3)$$

At node k, because node i is a neighbor, from Eq. 1 above, it follows that:

$$FD_j^k(t) \leq D_{jk}^i(t) \quad (4)$$

Combining Eq. 3, and Eq. 4, it follows that:

$$FD_j^k(t)<FD_j^i(t) \quad (5)$$

Eq. 5 states that, if k is a successor of node i in a path to destination j, then k's feasible distance to j is strictly less than the feasible distance of node i to node j. Now if the successor sets define a loop at time t with respect to node j, then for some node p on the loop, an absurd relation is arrived at wherein $FD_j^p(t)<FD_j^p(t)$.

Therefore, the LFI conditions are sufficient for loop-freedom.

The invariants used in LFI are independent of whether the algorithm uses link states or distance vectors; in link-state algorithms, such as MPDA, the $D_{jk}^i$ are computed locally from the link-states communicated by the neighbors while in distance-vector algorithms, like the MPATH presented here, the $D_{jk}^i$ are directly communicated.

The invariants (1) and (2) suggest a technique for computing $S_j^i(t)$ such that the successor graph $SG_j(t)$ for destination j is loop-free at every instant. The key is determining $FD_j^i(t)$ in Eq. (1), which requires node i to know $D_{ji}^k(t)$, the distance from node i to node j in the topology table $T_i^k$ that node i communicated to neighbor k. As a result of non-zero propagation delays, $T_i^k$ is a time-delayed version of $T^i$. It will be appreciated that, if node i delays updating of $FD_j^i$ with $D_j^i$ until k incorporates the distance $D_j^i$ in its tables, then $FD_j^i$ satisfies the LFI condition.

FIG. 6 exemplifies pseudocode for MPATH which enforces the LFI conditions by synchronizing the exchange of update messages among neighbors using query and reply flags. If a node sends a message with a query bit set, then the node must wait until a reply is received from all its neighbors before the node is allowed to send the next update message. The node is said to be in ACTIVE state during this period. The inter-neighbor synchronization used in MPATH spans only one hop, unlike algorithms that use diffusing computation that potentially span the whole network, such as DASM.

Assume that all nodes are in a PASSIVE state initially with correct distances to all other nodes and that no messages are in transit or pending to be processed. The behavior of the network where every node runs MPATH is such that when a finite sequence of link cost changes occurs in the network within a finite time interval, some or all nodes to go through a series of PASSIVE-to-ACTIVE and ACTIVE-to-PASSIVE state transitions, until eventually all nodes become PASSIVE with correct distances to all destinations.

Let a node in PASSIVE state receive an event resulting in changes in its distances to some destinations. Before the node sends an update message to report new distances, it checks if the distance $D_j^i$ to any destination j has increased above the previously reported distance $RD_j^i$. If none of the distances increased, then the node remains in PASSIVE state. Otherwise, the node sets the query flag in the update message, sends it, and goes into ACTIVE state. When in ACTIVE state, a node cannot send any update messages or add neighbors to any successor set. After receiving replies from all its neighbors, the node is allowed to modify the successor sets and report any changes that may have occurred since the time it has transitioned to ACTIVE state, and if none of the distances increased beyond the reported distance, the node transitions to PASSIVE state. Otherwise, the node sends the next update message with the query bit set and becomes ACTIVE again, and the whole cycle repeats. If a node receives a message with the query bit set when in PASSIVE state, it modifies its tables and then sends back an update message with the reply flag set. Otherwise, if the node happens to be in ACTIVE state, it modifies the tables but because the node is not allowed to send updates when in ACTIVE state, the node sends back an empty message with no updates but the reply bit set. If a reply from a neighbor is pending, when the link to the neighbor fails then an implicit reply is assumed, and such a reply is assumed to report an infinite distance to the destination. Because replies are given immediately to queries and replies are assumed to be given upon link failure, deadlocks due to inter-neighbor synchronization cannot occur. Eventually, all nodes become PASSIVE with correct distances to destinations.

2. Correctness of MPATH

The following properties of MPATH are to be proven: (1) MPATH eventually converges with $D_j^i$; giving the shortest distances and (2) the successor graph $SG_j$ is loop-free at every instant and eventually converges to the shortest multipath. PATH works essentially like PDA except that the kind of update information exchanged is different; PDA exchanges link-state while PATH exchanges distance-vectors with predecessor information. The correctness proof of PATH is identical to PDA and are reproduced here for correctness. The convergence of MPATH directly follows from the convergence of PATH because extensions to MPATH are such that update messages in MPATH are only delayed a finite amount of time.

Definitions: The n-hop minimum distance of node i to node j in a network is the minimum distance possible using a path of n hops, (links) or less. A path that offers the n-hop minimum distance is called n-hop minimum path. If there is no path with n hops or less from node i to j then the n-hop minimum distance from i to j is undefined. An n-hop minimum tree of a node i is a tree in which node i is the root and all paths of n hops or less from the root to any other node is an n-hop minimum path.

Let G denote the final topology of the network, as would be seen by an omniscient observer after all link changes have occurred. Without loss of generality, assume G is connected; if G is disconnected, the proof applies to each connected component independently.

It is presumed that a router i knows at least the n-hop minimum tree, if the tree contained in its main link table $T^i$ is at least an n-hop minimum tree rooted at i in G, and there are at least n nodes in $T^i$ that are reachable from the root i. Note that $T^i$ is such that the links with head nodes that are more than n hops away from i may have costs that do not agree with the link costs in G.

Theorem 2: If node i has adjacent link costs that agree with G and for each neighbor k, $T_k^i$ represents at least an (n−1)-hop minimum tree, then after the execution of MTU, the minimum cost tree contained in $T^i$ is at least an n-hop minimum tree.

Proof: Let $H_n^i$ denote an n-hop minimum tree rooted at node i in G and let $M_n^i$ be the set of nodes that are within n hops from i in $H_n^i$. Let $D_n^{ij}$ denote the distance of i to j in $H_n^i$. Let $d_{ij}$ be the cost of the link i→j. Node i is called the head of the link i→j. The notation i↦j indicates a path from i to j of zero or more links; if the path has zero links, then i=j. The length of path i↦j is the sum of costs of all links in the path.

Property 1: From the principle of optimality (the sub-path of a shortest path between two nodes is also the shortest path between the end nodes of the sub-path), if H and H' are two n-hop minimum trees rooted at node i and M and M' are sets of nodes that are within n hops from i in H and H' respectively, then $M=M'=M_n^i$ and $M_n^i \geq n$. For each $j \in M_n^i$ the length of path i↦j in both H and H' is equal to $D_n^{ij}$. For $h \geq n$, $D_h^{ij} \leq D_n^{ij}$.

Let $A^i = \cup_{k \in N^i} A_k^i$, where $A_k^i$ is the set of nodes in $T_k^i$. Because $T_k^i$ is at least an (N−1)-hop minimum tree and node i can appear at most once in each of $A_k^i$, each $A_k^i$ has at least N−1 unique elements. Therefore, $A^i$ has at least N−1 elements.

Let $M_n^i$ be the set of n−1 nearest elements to node i in $A^i$. That is, $M_n^i \subseteq A^i$, $|M_n^i|=n-1$, and for each $j \in M_n^i$, and $v \in A^i - M_n^i$, $\min\{D_{jk}^i + l_k^i | k \in N^i\} \leq \min\{D_{vk}^i + l_k^i | k \in N^i\}$.

To prove the theorem it is sufficient to prove the following:
1. Let $G_n^i$ represent the graph constructed by MTU on lines 2 and 3. (i.e., before applying Dijkstra in line 4). For each $j \in M_n^i$ there is a path i↦j in $G_n^i$ such that its length is at most $D_n^{ij}$.
2. After running Dijkstra on $G_n^i$ on line 4 in MTU, the resulting tree is at least an n-hop minimum tree.

Let us first assume part 1 is true and prove part 2. From the statement in part 1 for each node $j \in M_n^i$ there is a path i↦j in $G_n^i$ with length at most $D_n^{ij}$. In the resulting tree after running Dijkstra, we can infer there is a path i↦j with length at most $D_n^{ij}$. Because there are n−1 nodes in $M_n^i$, the tree constructed has at least n nodes including node i. From property 1, it follows that the tree constructed is at least an n-hop minimum tree.

To prove part 1, order the nodes in $M_n^i$ in non-decreasing order. The proof is by induction on the sequence of elements in $M_n^i$. The base case is true because for $m_1$, the first element of $M^i$, $l_{m_1}^i = \min\{l_k^i | k \in N^i\}$ and $l_{m_1}^i = D_1^{i,m}$s 1. As induction hypothesis, let the statement hold for the first m−1 elements of $M_n^i$. Consider the $m^{th}$ element $j \in M_n^i$. Let K be the highest priority neighbor for which $D_{jk}^i + l_k^i = \min\{D_{jk}^i + l_k^i | k \in N^i\}$. At most m−1 nodes in $T_K^i$ can have lesser or equal distance than j which implies path K↦j exists with at most m−1 hops. Let v be the neighbor of j in $T_K^i$. Then the path K↦v→j has at most m−1 hops. Because $T_K^i$ is at least a (n−1)-hop minimum tree, the link v→j must agree with G. Since $D_{vK}^i + l_K^i < D_{jK}^i + l_K^i$, from the induction hypothesis there is a path i↦v in G, such that the length is at most $D_n^{i,v}$.

The following now shows that the preferred neighbor for $v$ is also K, so that the link $v \to j$ will be included in the construction of $G_n^i$ thus ensuring the existence of the path $i \mapsto j$ in $G_n^i$. If some neighbor K' other than K is the preferred neighbor for $v$ then one of the following two conditions should hold: (a) $D_{vK'}^i + l_{K'}^i < D_{vK}^i + l_K^i$ or (b) $D^{vK'} + l_{K'}^i = D_{vK}^i + l_K^i$ and priority of K' is greater than priority of K.

Case (a): Because $D_{jK}^i + l_K^i \leq D_{jK'}^i + l_{K'}^i$ it follows that the path $v \mapsto j$ in $T_{K'}^i$, is greater than cost of $v \to j$ in G which implies that $T_{K'}^i$, is not an (n−1) hop minimum tree, which contradicts the assumption. Therefore $D_{vk}^i + l_k^i = \min\{D_{vk}^i + l_k^i | k \in N^i\}$.

Case (b): Let $Q_j$ be the set of neighbors that give the minimum distance for j, such as for each $k \in Q_j$, $D_{jk}^i + l_k^i = \min\{D_{jk}^i + l_k^i | k \in N^i\}$. Similarly, let $Q_v$ be such that for each $k \in Q_v$, $D_{vk}^i + l_k^i = \min\{D_{vk}^i + l_k^i | k \in N^i\}$. If $k \in Q_v$ and $k \notin Q_j$, then it follows from same argument as in case (a) that $v \mapsto j$ in $T_k^i$ is greater than cost of $v \to j$ in G implying $T_k^i$ is not a (n−1) hop minimum tree, which again is a contradiction of the assumption. Because K has the highest priority among all members of $Q_j$ and $Q_v \subseteq Q_j$ and $k \in Q_v$, K also has the highest priority among all members of $Q_v$. Therefore $Q_v \subseteq Q_j$. Also, from the same argument it can be inferred that $K \in Q_v$. This proves that $v \to j$ will be included in the construction of $G_n^i$. Because $D_n^{i,v} + d_{vj} = D_n^{i,j}$ in G, where $d_{vj}$ is the final cost of link $v \to j$, and length of $i \mapsto v$ in $G_n^i$ less than or equal to $D_n^{i,v}$ from the induction hypothesis, the length of $i \mapsto v$ in $G_n^i$ is less than or equal to $D_n^{i,j}$. This proves part 1 of the theorem.

Theorem 3: A finite time after the last link cost change in the network, the main topology $T^i$ at each node i gives the correct shortest paths to all known destinations.

Proof: The proof is identical to the proof of Theorem 2 and is performed by induction on $t_n$, the global time when for each node i, $T^i$ is at least an n-hop minimum tree. Because the longest loop-free path in the network has at most N−1 links where N is number of nodes in the network, $t_{N-1}$ is the time when every node has the shortest path to every other node, wherein $t_{N-1}$ should be shown to be finite. The base case of $t_{N-1}$ is $t_1$, the time when every node has a one-hop minimum distance and because the adjacent link changes are notified within finite time, $t_1 < \infty$. Let $t_n < \infty$ for some n<N. Given that the propagation delays are finite, each node will have each of its neighbors n-hop minimum tree in finite time after $t_n$. From Theorem 2 we can see that the node will have at least the (n+1)-hop minimum tree in finite time after $t_n$. Therefore, $t_{n+1} < \infty$. From induction it will be appreciated that $t_{N-1} < \infty$.

A node generates update messages only to report changes in distances and predecessor, so after convergence no messages will be generated. The following theorems show that MPATH provides instantaneous loop-freedom and correctly computes the shortest multipath.

Theorem 4: For the algorithm MPATH executed at node i, let $t_n$ be the time when $RD_j^i$ is updated and reported for the $n^{th}$ time. Then, the following conditions always hold:

$$FD_j^i(t_n) \leq \min\{RD_j^i(t_{n-1}), RD_j^i(t_n)\} \quad (6)$$

$$FD_j^i(t) \leq FD_j^i(t_n) t \in [t_n, t_{n+1}] \quad (7)$$

Proof: From the working of MPATH in FIG. 6, it is observed that $RD_j^i$ is updated at line 3c when (a) the node goes from PASSIVE-to-ACTIVE because of one or more distance increases; (b) the node receives the last reply and goes from ACTIVE-to-PASSIVE state; (c) the node is in PASSIVE state and remains in PASSIVE state because the distance did not increase for any destination; and (d) the node receives the last reply but immediately goes into ACTIVE state. The reported distance $RD_j^i$ remains unchanged during the ACTIVE phase. Because $FD_j^i$ is updated at line 3a each time $RD_j^i$ is updated at line 3c, Eq. (6) follows. When the node is in ACTIVE phase, $FD_j^i$ may also be modified by the statement on line 3f, which implies Eq. (7).

Theorem 5: The safety property; at any time t, the successor sets $S_j^i(t)$ which are computed by MPATH are loop-free.

Proof: The proof is based on showing that the $FD_j^i$ and $S_j^i$ computed by MPATH satisfy the LFI conditions. Let $t_n$, be the time when $RD_j^i$ is updated and reported for the $n^{th}$ time. The proof is by induction on the interval $[t_n, t_{n+1}]$. Let the LFI condition be true up to time $t_n$, we show that:

$$FD_j^i(t) \leq D_{ji}^k(t) t \in [t_n, t_{n+1}] \quad (8)$$

From Theorem 4 we have:

$$FD_j^i(t_n) \leq \min\{RD_j^i(t_{n-1}), RD_j^i(t_n)\} \quad (9)$$

$$FD_j^i(t_{n+1}) \leq \min\{RD_j^i(t_n), RD_j^i(t_{n+1})\} \quad (10)$$

$$FD_j^i(t) \leq FD_j^i(t_n) t \in [t_n, t_{n+1}] \quad (11)$$

Combining the above equations we arrive at:

$$FD_j^i(t) \leq \min\{RD_j^i(t_{n-1}), RD_j^i(t_n)\} t \in [t_n, t_{n+1}] \quad (12)$$

Let t' be the time when a message sent by i at $t_n$ is received and processed by neighbor k. Because of the non-zero propagation delay across any link, t' is such that $t_n < t' < t_{n+1}$ and because $RD_j^i$ is modified at $t_n$ and remains unchanged in $(t_n, t_{n+1})$ it follows that:

$$RD_j^i(t_{n-1}) \leq D_{ji}^k(t) t \in [t_n, t'] \quad (13)$$

$$RD_j^i(t_n) \leq D_{ji}^k(t) t \in [t_n, t_{n+1}] \quad (14)$$

From Eq. (13) and (14):

$$\min\{RD_j^i(t_{n-1}), RD_j^i(t_n)\} \leq D_{ji}^k(t) t \in [t_n, t_{n+1}] \quad (15)$$

From (12) and (15) the inductive step (8) follows. Because $FD_j^i(t_0) \leq D_{ji}^k(t_0)$ at initialization, from induction it is known that $FD_j^i(t) \leq D_{ji}^k(t_0)$ for all t. Given that the successor sets are computed based on $FD_j^i(t)$, it follows that the LFI conditions are always satisfied. According to the Theorem 1 this implies that the successor graph $SG_j$ is always loop-free.

Theorem 6: Liveness property; a finite time after the last change in the network, the $D_j^i$ gives the correct shortest distances and $S_j^i = \{k | D_j^k < D_j^i, k \in N^i\}$.

Proof: The proof is similar to the proof of Theorem 4. The convergence of MPATH follows directly from the convergence of PATH because the update messages in MPATH are only delayed a finite time as allowed at line 4 in algorithm PATH. Therefore, the distances $D_j^i$ in MPATH also converge to shortest distances. Because changes to $D_j^i$ are always reported to the neighbors and are incorporated by the neighbors in their tables in finite time $D_{jk}^i = D_j^k$, for $k \in N^i$ after convergence. From line 3a in MPATH, it is observed that when node i becomes passive $FD_j^i = D_j^i$ holds true. Because all nodes are passive at convergence it follows that $S_j^i = \{k | D_{jk}^i < FD_j^i, k \in N^i\} = \{k | D_j^k < D_j^i, k \in N^i\}$.

3. Complexity Analysis

The main difference between PATH and MPATH is that the update messages sent in MPATH are delayed a finite amount of time in order to enforce the invariants. As a result, the complexity of PATH and MPATH are essentially the same and are therefore collectively analyzed.

The storage complexity is the amount of table space needed at a node. Each one of the $N^i$ neighbor tables and the main distance tables has size of the order $O(|N|)$ and the main link table $T^i$ can grow, during execution of MTU, to size at most $|N^i|$ times $O(|N|)$. The storage complexity is therefore of the order $O(|N^i||N|)$.

The time complexity is the time it takes for the network to converge after the last link cost change in the network. To determine time complexity it is assumed that the computation time is negligible in comparison with the communication time. If $t_n$ is the time when every node has the n-hop minimum tree, because every node processes and reports changes in finite time $|t_{n+1}-t_n|$ is bounded. Let $|t_{n+1}-t_n| \leq \theta$ for some finite constant $\theta$. From theorem 3, the convergence time can be at most $|N|\theta$ and, hence, the time complexity is $O(|N|)$.

The computation complexity is the time taken to build the node's shortest path tree in $T^i$ from the neighbor tables $T_k^i$. Updating of $T^i$ with $T_k^i$ information is $O(|N^i||N|)$ operation and running Dijkstra on $T^i$ takes $O(|N^i||N|\log(|N|))$. Therefore the computational complexity is $O(|N^i||N|+|N^i||N|\log(|N|))$.

The communication complexity is the number of update messages required for propagating a set of link-cost changes. The analysis for multiple link-cost-changes is complex because of the sensitivity to the timing of the changes. So, therefore the analysis is provided only for the case of a single link-cost change. A node removes a link from its shortest path tree if only a shorter path using two or more links is discovered and the path is stored. Therefore, a removed link will not be added again to the shortest path which means that a link can be included and deleted from the shortest path by a node at most one time. It will be appreciated that since nodes report each change only once to each neighbor, that an update message can travel only once on a given link and therefore the number of messages sent by a node can be at most $O(|E|)$.

For certain topologies and sensitively timed sequences of link cost changes the amount of communication required by PATH can be exponential. One industry example (Humblet) exhibits such behavior, and though PATH is different from the shortest-path algorithm utilized therein, it should be noted that PATH is not immune from such exponential behavior. However, it appears that such scenarios would require sensitively timed link-cost changes which are very unlikely to occur in practice. If necessary, a small hold-down time before sending update messages may be used to prevent such behavior.

Accordingly, it will be seen that this invention provides a routing algorithm based on distance information that provides multiple paths that need not have equal costs and that are loop-free at every instant, without requiring inter-nodal synchronization spanning more than one hop. The loop-free invariant conditions presented here are quite general and can be used with existing internet protocols. The multiple successors that MPATH makes available at each node can be used for traffic load-balancing, which is necessary for minimizing delays in a network as has been shown using other algorithms, such as MPDA. MPATH can therefore be used as an alternative to MPDA to get similar performance.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for loop-free multipath routing of data in a network, comprising:
   (a) maintaining at each node i in a network,
      (i) a main distance table (MDT) containing $D_j^i$ and $p_j^i$, where $D_j^i$ is the distance of node i to destination j and $p_j^i$ is the predecessor to destination j on the shortest path from i to j,
      (ii) said MDT further containing, for each destination j, successor set $S_j^i$, feasible distance $FD_j^i$, reported distance $RD_j^i$, and flags designated as changed and report-it,
      (iii) a main link table (MLT) $T^i$ which is the node's view of the network and contains links represented by (m, n, d) where (m, n) is a link with cost d,
      (iv) a neighbor distance table (NDT) for neighbor k containing $D_{jk}^i$ and $p_{jk}^i$ where $D_{jk}^i$ is the distance of neighbor k to j as communicated by k and $p_{jk}^i$ is the predecessor to j on the shortest path from k to j as notified by k,
      (v) a neighbor link table (NLT) $T_k^i$ which is the view that neighbor k has of the network as known to i and contains link information derived from the distance and predecessor information in the NDT, and
      (vi) an adjacent link table (ALT) containing the cost $l_k^i$ of an adjacent link to each neighbor k, wherein said cost is infinity if a link is down;
   (b) in response to receipt of an update message M from a neighbor k, detection of a change in cost of an adjacent link to k, or detection of a change in status of an adjacent link to k,
      (i) updating the NDT and NLT for neighbor k with links (m, n, d) where $d=D_{nk}^i-D_{mk}^i$ and $m=p_{nk}^i$, and
      (ii) constructing an MLT for neighbor k by merging topologies $T_k^i$ and adjacent links $l_k^i$; and
   (c) routing data through a loop-free path in the network; wherein at least one said loop-free path is determined using information in each of said tables at each node i.

2. A method as recited in claim 1, further comprising:
   (d) for each destination j marked as changed, adding an update entry $[j, D_j^i, p_j^i]$ to a new message M'; and
   (e) within a finite amount of time, sending message M' to each neighbor k.

3. A method as recited in claim 2, wherein an update message comprises:
   at least one update entry;

said update entry comprising a triplet [j,d,p], where d is the distance of the node sending the message to destination j and p is the predecessor on the path to j; and flags for synchronization designated as query and reply.

4. A method as recited in claim 1, further comprising: updating the MLT with link information reported by the neighbor k that offers the shortest distance from the node i to the head node m of the link if two or more NLTs contain conflicting information of link (m, n).

5. A method as recited in claim 1, further comprising: after merging topologies $T_k^i$ and adjacent links $l_k^i$, running Dijkstra's shortest path algorithm to find the shortest path tree and deletes all links from the MLT that are not in the tree.

6. A method as recited in claim 5, further comprising: obtaining distances $D_j^i$ and predecessors $p_j^i$ from the MLT.

7. A method as recited in claim 6, further comprising: comparing the tree with the previous shortest path tree and reporting only the differences to the neighbors.

8. A method as recited in claim 1, further comprising: computing a successor set $S_j^i$ by, for each destination j, allowing a node i to choose a successor having a distance to j as known to i that is less than the distance of node i to destination j that is known to a neighbor of node i.

9. A method as recited in claim 8, further comprising synchronizing the exchange of update messages among neighbors using query and reply flags contained within the messages.

10. A method as recited in claim 9, wherein if a node sends a message with a query flag set, said node must wait until a reply is received from all of said node's neighbors before said node is allowed to send the next update message.

11. A method as recited in claim 10, wherein said node is deemed to be in an ACTIVE state when said node sends a message with a query flag set.

12. A method as recited in claim 11, wherein said node is deemed to be in a PASSIVE state when said node has no message with a query flag set that is in transit or pending to be processed.

13. A method as recited in claim 12:
wherein if a node in a PASSIVE state receives an event resulting in changes in its distances to a destination, before the node sends an update message to report a new distance, said node checks if the distance $D_j^i$ to any destination j has increased above the previously reported distance $RD_j^i$;
wherein if no distance has increased, then said node remains in a PASSIVE state; and
wherein if a distance has increased, said node sets the query flag in the update message, sends said message, and goes into an ACTIVE state.

14. A method as recited in claim 11;
wherein a node in an ACTIVE cannot send any update messages or add neighbors to any successor set;
wherein after receiving replies from all its neighbors, the node is allowed to modify the successor sets and report any changes that may have occurred since the time it has transitioned to ACTIVE state; and
wherein if none of the distances increased beyond the reported distance, the node transitions to PASSIVE state.

15. A method as recited in claim 12:
wherein if a node receives a message with the query flag set when in PASSIVE state, said node modifies said node's tables and sends back an update message with the reply-flag set; and
wherein if a node receives a message with the query flag set when in ACTIVE stage, said node modifies said node's tables and sends back an empty message with no updates and with the reply flag set.

16. A method for loop-free multipath routing of data in a network, comprising:
(a) maintaining at each node i in a network,
   (i) a main distance table (MDT) containing $D_j^i$ and $p_j^i$, where $D_j^i$ is the distance of node i to destination j and $p_j^i$ is the predecessor to destination j on the shortest path from i to j,
   (ii) said MDT further containing, for each destination j, successor set $S_j^i$, feasible distance $FD_j^i$, reported distance $RD_j^i$, and flags designated as changed and report-it,
   (iii) a main link table (MLT) $T^i$ which is the node's view of the network and contains links represented by (m, n, d) where (m, n) is a link with cost d,
   (iv) a neighbor distance table (NDT) for neighbor k containing $D_{jk}^i$ and $p_{jk}^i$ where $D_{jk}^i$ is the distance of neighbor k to j as communicated by k and $p_{jk}^i$ is the predecessor to j on the shortest path from k to j as notified by k,
   (v) a neighbor link table (NLT)$T_k^i$ which is the view that neighbor k has of the network as known to i and contains link information derived from the distance and predecessor information in the NDT, and
   (vi) an adjacent link table (ALT) containing the cost $l_k^i$ of an adjacent link to each neighbor k, wherein said cost is infinity if a link is down;
(b) in response to receipt of an update message M from a neighbor k, detection of a change in cost of an adjacent link to k, or detection of a change in status of an adjacent link to k,
   (i) updating the NDT and NLT for neighbor k with links (m, n, d) where $d=D_{nk}^i-D_{mk}^i$ and $m=p_{nk}^i$, and
   (ii) constructing an MLT for neighbor k by merging topologies $T_k^i$ and adjacent links $l_k^i$;
(c) for each destination j marked as changed, adding an update entry $[j,D_j^i,p_j^i]$ to a new message M';
(d) within a finite amount of time, sending message M' to each neighbor k; and
(e) routing data through a loop-free path in the network;
wherein at least one said loop-free path is determined using information in each of said tables at each node i.

17. A method as recited in claim 16, wherein an update message comprises:
at least one update entry;
said update entry comprising a triplet [j,d,p], where d is the distance of the node sending the message to destination j and p is the predecessor on the path to j; and
flags for synchronization designated as query and reply.

18. A method as recited in claim 16, further comprising: updating the MLT with link information reported by the neighbor k that offers the shortest distance from the node i to the head node m of the link if two or more neighbor link tables contain conflicting information of link (m, n).

19. A method as recited in claim 16, further comprising: after merging topologies $T_k^i$ and adjacent links $l_k^i$, running Dijkstra's shortest path algorithm to find the shortest path tree and deletes all links from the MLT that are not in the tree.

20. A method as recited in claim 19, further comprising: obtaining distances $D_j^i$ and predecessors $p_j^i$ from the MLT.

21. A method as recited in claim 20, further comprising:

comparing the tree with the previous shortest path tree and reporting only the differences to the neighbors.

22. A method for loop-free multipath routing of data in a network, comprising:
  (a) maintaining at each node i in a network,
    (i) a main distance table (MDT) containing $D_j^i$ and $p_j^i$, where $D_j^i$ is the distance of node i to destination j and $p_j^i$ is the predecessor to destination j on the shortest path from i to j,
    (ii) said MDT further containing, for each destination j, successor set $S_j^i$ feasible distance $FD_j^i$, reported distance $RD_j^i$, and flags designated as changed and report-it,
    (iii) a main link table (MLT) $T^i$ which is the node's view of the network and contains links represented by (m, n, d) where (m, n) is a link with cost d,
    (iv) a neighbor distance table (NDT) for neighbor k containing $D_{jk}^i$ and $p_{jk}^i$ where $D_{jk}^i$ is the distance of neighbor k to j as communicated by k and $p_{jk}^i$ is the predecessor to j on the shortest path from k to j as notified by k,
    (v) a neighbor link table (NLT)$T_k^i$ which is the view that neighbor k has of the network as known to i and contains link information derived from the distance and predecessor information in the NDT, and
    (vi) an adjacent link table (ALT) containing the cost $l_k^i$ of an adjacent link to each neighbor k, wherein said cost is infinity if a link is down;
  (b) in response to receipt of an update message M from a neighbor k, detection of a change in cost of an adjacent link to k, or detection of a change in status of an adjacent link to k,
    (i) updating the NDT and NLT for neighbor k with links (m, n, d) where $d=D_{nk}^i-D_{mk}^i$ and $m=p_{nk}^i$,
    (ii) constructing an MLT for neighbor k by merging topologies $T_k^i$ and adjacent links $l_k^i$;
  (c) computing a successor set $S_j^i$ by, for each destination j, allowing a node i to choose a successor having a distance to j as known to i that is less than the distance of node i to destination j that is known to a neighbor of node i; and
  (d) routing data through a loop-free path in the network; wherein at least one said loop-free path is determined using information in said tables at each node i.

23. A method as recited in claim 22, further comprising:
updating the MLT with link information reported by the neighbor k that offers the shortest distance from the node i to the head node m of the link if two or more NLTs contain conflicting information of link (m, n).

24. A method as recited in claim 22, further comprising:
after merging topologies $T_k^i$ and adjacent links $l_k^i$, running Dijkstra's shortest path algorithm to find the shortest path tree and deletes all links from the MLT that are not in the tree.

25. A method as recited in claim 24, further comprising:
obtaining distances $D_j^i$ and predecessors $p_j^i$ from the MLT.

26. A method as recited in claim 25, further comprising:
comparing the tree with the previous shortest path tree and reporting only the differences to the neighbors.

27. A method as recited in claim 22, further comprising synchronizing the exchange of update messages among neighbors using query and reply flags contained within the messages.

28. A method as recited in claim 27, wherein if a node sends a message with a query flag set, said node must wait until a reply is received from all of said node's neighbors before said node is allowed to send the next update message.

29. A method as recited in claim 28, wherein said node is deemed to be in an ACTIVE state when said node sends a message with a query flag set.

30. A method as recited in claim 29, wherein said node is deemed to be in a PASSIVE state when said node has no message with a query flag set that is in transit or pending to be processed.

31. A method as recited in claim 30:
wherein if a node in a PASSIVE state receives an event resulting in changes in its distances to a destination, before the node sends an update message to report a new distance, said node checks if the distance $D_j^i$ to any destination j has increased above the previously reported distance $RD_j^i$;
wherein if no distance has increased, then said node remains in a PASSIVE state; and
wherein if a distance has increased, said node sets the query flag in the update message, sends said message, and goes into an ACTIVE state.

32. A method as recited in claim 29, wherein a node in an ACTIVE cannot send any update messages or add neighbors to any successor set.

33. A method as recited in claim 29:
wherein after receiving replies from all its neighbors, the node is allowed to modify the successor sets and report any changes that may have occurred since the time it has transitioned to ACTIVE state; and
wherein if none of the distances increased beyond the reported distance, the node transitions to PASSIVE state.

34. A method as recited in claim 30:
wherein if a node receives a message with the query flag set when in PASSIVE state, said node modifies said node's tables and sends back an update message with the reply flag set; and
wherein if a node receives a message with the query flag set when in ACTIVE stage, said node modifies said node's tables and sends back an empty message with no updates and with the reply flag set.

35. A method for loop-free multipath routing of data in a network, comprising:
  (a) maintaining at each node i in a network,
    (i) a main distance table (MDT) containing $D_j^i$ and $p_j^i$, where $D_j^i$ is the distance of node i to destination j and $p_j^i$ is the predecessor to destination j on the shortest path from i to j,
    (ii) said MDT further containing, for each destination j, successor set $S_j^i$, feasible distance $FD_j^i$, reported distance $RD_j^i$, and flags designated as changed and report-it,
    (iii) a main link table (MLT) $T^i$ which is the node's view of the network and contains links represented by (m, n, d) where (m, n) is a link with cost d,
    (iv) a neighbor distance table (NDT) for neighbor k containing $D_{jk}^i$ and $p_{jk}^i$ where $D_{jk}^i$ is the distance of neighbor k to j as communicated by k and $p_{jk}^i$ is the predecessor to j on the shortest path from k to j as notified by k,
    (v) a neighbor link table (NLT)$T_k^i$ which is the view that neighbor k has of the network as known to i and contains link information derived from the distance and predecessor information in the NDT, and
    (vi) an adjacent link table (ALT) containing the cost $l_k^i$ of an adjacent link to each neighbor k, wherein said cost is infinity if a link is down;

(b) in response to receipt of an update message M from a neighbor k, detection of a change in cost of an adjacent link to k, or detection of a change in status of an adjacent link to k,
  (i) updating the NDT and NLT for neighbor k with links (m, n, d) where $d=D_{nk}^i-D_{mk}^i$ and $m=p_{nk}^i$,
  (ii) constructing an MLT for neighbor k by merging topologies $T_k^i$ and adjacent links $l_k^i$, and
  (iii) running Dijkstra's shortest path algorithm to find the shortest path tree and deletes all links from the MLT that are not in the tree;
(c) computing a successor set $S_j^i$ by, for each destination j, allowing a node i to choose a successor having a distance to j as known to i that is less than the distance of node i to destination j that is known to a neighbor of node i; and
(d) routing data through a loop-free path in the network; wherein at least one said loop-free path is determined using information in said tables at each node i.

36. A method as recited in claim 35, further comprising: updating the MLT with link information reported by the neighbor k that offers the shortest distance from the node i to the head node m of the link if two or more NLTs contain conflicting information of link (m, n).

37. A method as recited in claim 36, further comprising: obtaining distances $D_j^i$ and predecessors $p_j^i$ from the MLT.

38. A method as recited in claim 37, further comprising: comparing the tree with the previous shortest path tree and reporting only the differences to the neighbors.

39. A method as recited in claim 35, further comprising synchronizing the exchange of update messages among neighbors using query and reply flags contained within the messages.

40. A method as recited in claim 39, wherein if a node sends a message with a query flag set, said node must wait until a reply is received from all of said node's neighbors before said node is allowed to send the next update message.

41. A method as recited in claim 40, wherein said node is deemed to be in an ACTIVE state when said node sends a message with a query flag set.

42. A method as recited in claim 41, wherein said node is deemed to be in a PASSIVE state when said node has no message with a query flag set that is in transit or pending to be processed.

43. A method as recited in claim 42:
wherein if a node in a PASSIVE state receives an event resulting in changes in its distances to a destination, before the node sends an update message to report a new distance, said node checks if the distance $D_j^i$ to any destination j has increased above the previously reported distance $RD_j^i$;
wherein if no distance has increased, then said node remains in a PASSIVE state; and
wherein if a distance has increased, said node sets the query flag in the update message, sends said message, and goes into an ACTIVE state.

44. A method as recited in claim 41, wherein a node in an ACTIVE cannot send any update messages or add neighbors to any successor set.

45. A method as recited in claim 41:
wherein after receiving replies from all its neighbors, the node is allowed to modify the successor sets and report any changes that may have occurred since the time it has transitioned to ACTIVE state; and
wherein if none of the distances increased beyond the reported distance, the node transitions to PASSIVE state.

46. A method as recited in claim 42:
wherein if a node receives a message with the query flag set when in PASSIVE state, said node modifies said node's tables and sends back an update message with the reply flag set; and
wherein if a node receives a message with the query flag set when in ACTIVE stage, said node modifies said node's tables and sends back an empty message with no updates and with the reply flag set.

47. A method for loop-free multipath routing of data in a network, comprising:
(a) maintaining at each node i in a network,
  (i) a main distance table (MDT) containing $D_j^i$ and $p_j^i$, where $D_j^i$ is the distance of node i to destination j and $p_j^i$ is the predecessor to destination j on the shortest path from i to j,
  (ii) said MDT further containing, for each destination j, successor set $S_j^i$, feasible distance $FD_j^i$, reported distance $RD_j^i$, and flags designated as changed and report-it,
  (iii) a main link table (MLT) $T^i$ which is the node's view of the network and contains links represented by (m, n, d) where (m, n) is a link with cost d,
  (iv) a neighbor distance table (NDT) for neighbor k containing $D_{jk}^i$ and $p_{jk}^i$ where $D_{jk}^i$ is the distance of neighbor k to j as communicated by k and $p_{jk}^i$ is the predecessor to j on the shortest path from k to j as notified by k,
  (v) a neighbor link table (NLT) $T_k^i$ which is the view that neighbor k has of the network as known to i and contains link information derived from the distance and predecessor information in the NDT, and
  (vi) an adjacent link table (ALT) containing the cost $l_k^i$ of an adjacent link to each neighbor k, wherein said cost is infinity if a link is down;
(b) in response to receipt of an update message M from a neighbor k, detection of a change in cost of an adjacent link to k, or detection of a change in status of an adjacent link to k,
  (i) updating the NDT and NLT for neighbor k with links (m, n, d) where $d=D_{nk}^i-D_{mk}^i$ and $m=p_{nk}^i$,
  (ii) constructing an MLT for neighbor k by merging topologies $T_k^i$ and adjacent links $l_k^i$;
(c) computing a successor set $S_j^i$ by, for each destination j, allowing a node i to choose a successor having a distance to j as known to i that is less than the distance of node i to destination j that is known to a neighbor of node i;
(d) synchronizing the exchange of update messages among neighbors using query and reply flags contained within the messages; and
(e) routing data through a loop-free path in the network; wherein at least one said loop-free path is determined using information in said tables at each node i.

48. A method as recited in claim 47, further comprising: updating the MLT with link information reported by the neighbor k that offers the shortest distance from the node i to the head node m of the link if two or more NLTs contain conflicting information of link (m, n).

49. A method as recited in claim 47, further comprising: after merging topologies $T_k^i$ and adjacent links $l_k^i$, running Dijkstra's shortest path algorithm to find the shortest path tree and deletes all links from the MLT that are not in the tree.

50. A method as recited in claim 49, further comprising: obtaining distances $D_j^i$ and predecessors $p_j^i$ from the MLT.

51. A method as recited in claim 50, further comprising: comparing the tree with the previous shortest path tree and reporting only the differences to the neighbors.

52. A method as recited in claim 47, wherein if a node sends a message with a query-flag set, said node must wait until a reply is received from all of said node's neighbors before said node is allowed to send the next update message.

53. A method as recited in claim 52, wherein said node is deemed to be in an ACTIVE state when said node sends a message with a query flag set.

54. A method as recited in claim 53, wherein said node is deemed to be in a PASSIVE state when said node has no message with a query flag set that is in transit or pending to be processed.

55. A method as recited in claim 54:

wherein if a node in a PASSIVE state receives an event resulting in changes in its distances to a destination, before the node sends an update message to report a new distance, said node checks if the distance $D_j^i$ to any destination j has increased above the previously reported distance $RD_j^i$;

wherein if no distance has increased, then said node remains in a PASSIVE state; and wherein if a distance has increased, said node sets the query flag in the update message, sends said message, and goes into an ACTIVE state.

56. A method as recited in claim 53, wherein a node in an ACTIVE cannot send any update messages or add neighbors to any successor set.

57. A method as recited in claim 53:

wherein after receiving replies from all its neighbors, the node is allowed to modify the successor sets and report any changes that may have occurred since the time it has transitioned to ACTIVE state; and wherein if none of the distances increased beyond the reported distance, the node transitions to PASSIVE state.

58. A method as recited in claim 54:

wherein if a node receives a message with the query flag set when in PASSIVE state, said node modifies said node's tables and sends back an update message with the reply-flag set; and wherein if a node receives a message with the query flag set when in ACTIVE stage, said node modifies said node's tables and sends back an empty message with no updates and with the reply flag set.

* * * * *